Jan. 23, 1945.  E. C. WATSON  2,367,983
REGULATING SYSTEM
Original Filed Nov. 20, 1940   2 Sheets-Sheet 1

Total Ampere Turns on Fields

WITNESSES:
Leon M. Garman
Nw. C. Groome

INVENTOR
Earl C. Watson.
BY
James N. Ely
ATTORNEY

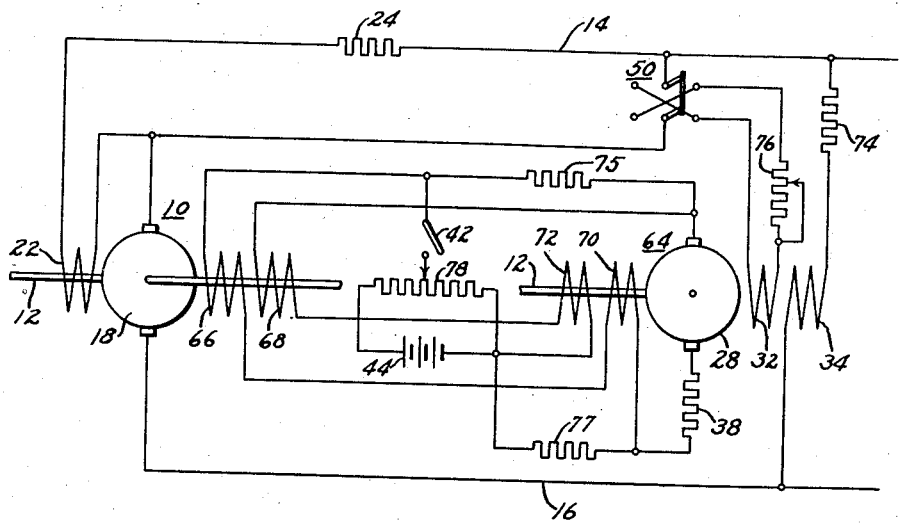
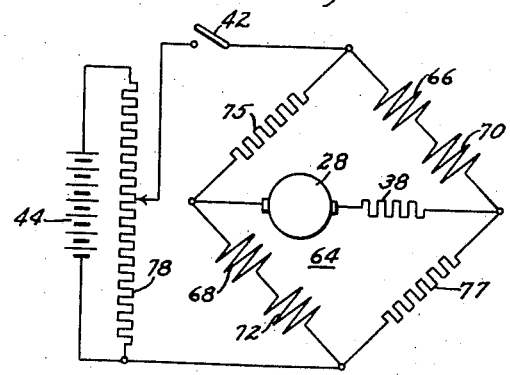

Patented Jan. 23, 1945

2,367,983

UNITED STATES PATENT OFFICE 2,367,983

REGULATING SYSTEM

Earl C. Watson, Wilkinsburg, Pa., assignor to Westinghouse Electric & Manufacturing Company, East Pittsburgh, Pa., a corporation of Pennsylvania Original application November 20, 1940, Serial No. 366,373. Divided and this application December 8, 1943, Serial No. 513,353

2 Claims. (Cl. 171—223)

This invention relates to regulating systems.

This application is a division of my application Serial No. 366,373, filed November 20, 1940, directed to "Regulating systems".

In certain industrial applications, such as, for example, the supplying of power for drying out cables, it is desired to maintain the same percentage droop in voltage from no-load to full-load over a given range of voltage. Many attempts have been made to provide such a voltage regulation, but these have so far proven to be unsatisfactory.

For example, where the power source is a separately excited shunt wound generator, the voltage tends to drop under the influence of two factors, namely, distortion or demagnetization of the IR drop. The distortion or demagnetization tends to vary proportionately with the flux or voltage while the IR drop remains constant in magnitude. If the generator is provided with a series field, satisfactory correction is not obtained since the series field is more effective at low voltage than at high voltage, while if the generator is an uncompensated generator, the regulation curve has a decided rise or hump at partial loads.

It is, therefore, an object of this invention to provide a regulating system for attaining a constant percentage regulation over a wide range of the voltage of a regulated generator.

Another object of this invention is to provide for regulating the voltage output of a power generator by utilizing a regulating generator provided with a plurality of field windings so connected as to control the energization of the power generator in accordance with the voltage output of the generator.

Other objects of this invention will become apparent from the following description, when taken in conjunction with the accompanying drawings, in which:

Fig. 3 is a schematic diagram of the apparatus and circuits of another embodiment of the regulating system of this invention; and Fig. 4 is a schematic diagram illustrating in a clarified manner a portion of the circuit of the system of Fig. 3.

Figure 1:
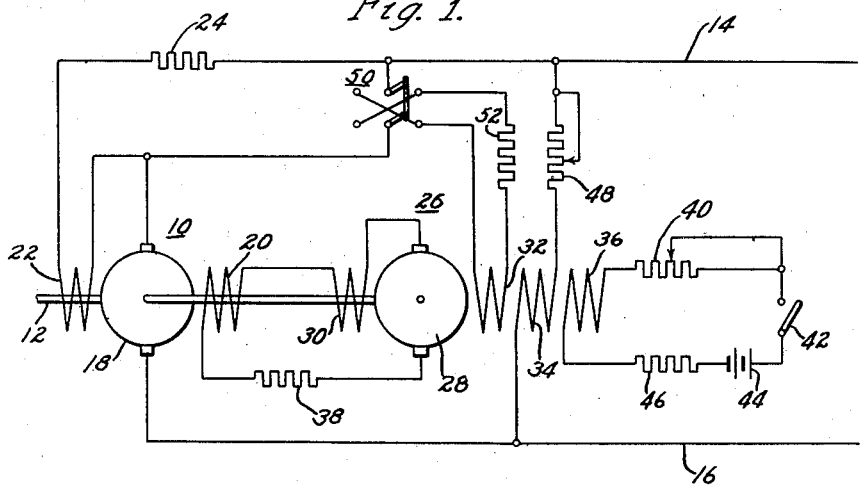
Figure 1 is a schematic diagram of the apparatus and circuits embodied in the teachings of this invention.

Referring to Fig. 1, there is illustrated a generator 10 disposed to be driven through the shaft 12 from any suitable power source, such as a motor (not shown). The generator 10 is electrically connected to conductors 14 and 16 for supplying power to a load (not shown). The generator 10 comprises an armature winding 18, a separately excited field winding 20 and a commutating field winding 22.

The armature winding 18 of the generator 10 is connected across the conductors 14 and 16, the commutating field winding 22 being connected in series circuit relation with the armature winding 18 and conductor 14. A resistor 24 is also connected in series circuit relation with the commutating winding 22 and the conductor 14, the purpose of which will be explained more fully hereinafter.

A regulating generator 26 is also disposed to be driven through the shaft 12 from the motor (not shown) at the same rate of speed as the generator 10 or at a constant speed from some other separate source of power (not shown). The regulating generator 26 comprises an armature winding 28 and a plurality of field windings 30, 32, 34 and 36 so arranged as to control the voltage output of the regulating generator and thereby to control the energization of the field winding 20 of the generator 10.

As illustrated, the field winding 30 of the regulating generator 26 is a series field winding connected in series circuit relation with the separately excited field winding 20 of the generator 10 and the armature winding 28 of the regulating generator 26. A balancing resistor 38 is also provided in series circuit relation with the armature winding 28 and the separately excited field winding 20 to provide a closed circuit through the self energizing field 30.

The field winding 36 is the main separately excited field winding for the regulating generator 26 and is connected from one terminal thereof through the variable rheostat 40, a manually operated switch 42, to one side of the battery 44 which is provided as a constant source of power, and from the other terminal of the winding through a balancing resistor 46 to the other side of the battery 44. The balancing resistor 46 is employed for limiting the current which flows through the field winding 36 when the rheostat 40 is cut out of the circuit.

The field winding 34 is a regulating separately excited field winding for the regulating generator 26 and is connected across conductors 14 and 16 through a variable rheostat 48. The regulating field winding 34 is so connected as to be differential with respect to the separately excited field winding 36. The variable rheostat 48 connected in series with the regulating winding 34 is disposed for manual operation for controlling the energization of the regulating winding 34 and thereby provide a voltage control for the generator 26.

The field winding 32 is an auxiliary separately excited field winding for the regulating generator 26 and is so disposed as to be connected across the commutating field 22 of the generator 10 and the resistor 24 in order to be energized in proportion to the load on the generator, the energization of the auxiliary field winding 32 being a direct measure of the drop across the commutating field 22 and the resistor 24. With regard to the energization of the auxiliary field winding 32, if the generator 10 is a large generator, the resistance of the commutating field 22 will be sufficient and the resistor 24 may be omitted from the circuit. However, where the generator 10 is a small generator, it is necessary to provide the resistor 24 in series circuit relation with the commutating winding 22 in order to obtain a voltage across the field winding 32 which is proportional to the load on the generator.

As illustrated, the auxiliary field winding 32 is disposed to be connected across the commutating field winding 22 and the resistor 24 by means of the double pole throw switch 50, the direction in which the switch 50 is thrown determining whether or not a drooping or rising characteristic is obtained in the voltage of the regulating generator 26. A balancing resistor 52 is illustrated connected in series with the auxiliary field winding 32 for controlling the energization of the series field, the balancing resistor 52 being initially adjusted for obtaining a given regulation.

In operation, with the generators 10 and 26 being driven at a constant speed, the closed circuit formed by the armature winding 28 of the generator 26, the balancing resistor 38, the separately excited field winding 20 of generator 10 and the self-energizing field winding 30 of the regulator 26, is balanced by adjusting the balancing resistor 38 so that the voltage output of the generator 26 from the current flowing in the self-energizing field 30 is just equal to the IR drop of the closed circuit. With the double throw switch 50 actuated to a circuit closing position to connect the auxiliary winding across the commutating winding 22 and the resistor 24 to give the desired rising or drooping characteristic to the voltage, initial adjustments in the balancing resistor 52 are then made for obtaining the desired percentage regulation. The variable resistor 48 is also adjusted to insert all of the sections of the resistor in circuit with the regulating winding 34 if maximum voltage of the generator 10 is desired or all of the sections out of the circuit if minimum voltage of the generator is desired.

Figure 2:
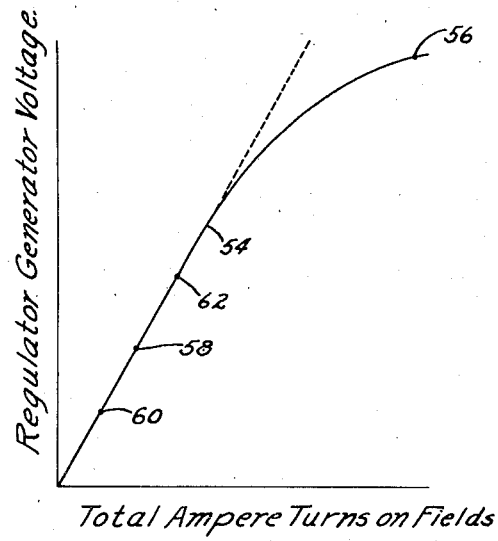
Fig. 2 is a graph, the curve of which represents the voltage of the regulating generator utilized in the schematic diagram of Fig. 1 as the ampere turns of its plurality of field windings is changed.

With these adjustments made and with the switch 42 in its open circuit position to prevent energization of the separately excited field winding 36, the voltage delivered by the regulating generator 26 will not increase since the balancing resistor 38 in series circuit with the self-energizing field 30 is adjusted at its critical value and the voltage output of the generator 26 is just equal to the IR drop of the closed circuit through the separately excited field winding 20 of the generator 10. As soon as the switch 42 is actuated to close the circuit which extends from the battery 44 through the variable rheostat 40, separately excited field winding 36 and the balancing resistor 46 back to the battery 44, the separately excited field winding 36 is so energized, depending upon the setting of the variable rheostat 40, as to effect an increase in the voltage output of the regulating generator 26. Referring to Fig. 2, as illustrated by the curve 54 the voltage of the generator 26 immediately increases to a point represented at 56, depending upon the initial energization of the separately excited field winding 36.

The increase in the voltage output of the regulating generator 26 immediately effects a flow of current in the separately excited field winding 20 of the generator 10 to so energize the winding 20 as to effect an increase in the voltage output of the generator 10 and consequently an increase in the voltage across the conductors 14 and 16.

As the voltage output of the generator 10 increases, the energization of the regulating winding 34 increases and since the winding 34 is connected differential with respect to the separately excited field winding 36, it has an immediate effect upon the voltage output of the regulating generator 26 to effect a decrease in the energization of the separately excited field winding 20 of the generator 10. This effect of the increase in the energization of the regulating field winding 34 on the voltage output of the generator 26 will continue until the ampere turns of the regulating winding 34 approximates the ampere turns of the separately excited field winding 36.

Assuming that the double throw switch 50 is thrown to connect the auxiliary winding 32 to provide a drooping characteristic, the winding 32 is differential with respect to the separately excited field winding 36 and is cumulative with respect to the regulating winding 34. With the balancing resistor 52 initially adjusted to give the desired percentage regulation, it is apparent that the auxiliary winding 32 and the regulating winding 34 cooperate to balance the effect of the separately excited field winding 36 on the voltage output of the regulating generator 26. With the ampere turns of the auxiliary winding 32 and the regulating winding 34 balancing the ampere turns of the separately excited field winding 36, the voltage output of the regulating generator 26 remains a constant, thereby giving substantially constant energization of the separately excited field winding 20 of the generator 10. Under these conditions, as the auxiliary winding 32 and the regulating winding 34 are energized until the ampere turns of windings 32 and 34 equal the ampere turns of winding 36, the voltage output of the generator 26 is lowered to a point 58 on the curve of Fig. 2.

If the load supplied by the generator 10 is reduced, the voltage across conductors 14 and 16 is increased, effecting an increase in the energization of the regulating winding 34, thereby reducing the energization of the generator 26 to reduce the voltage output thereof from the point 58 to a lower point 60, as shown, on the curve of Fig. 2. This effectively reduces the energization of the separately excited field winding 20 and consequently the voltage output of the generator 10 with the result that the energization of the regulating winding 34 is reduced until a balance is again effected between the ampere turns of the auxiliary winding 32 and the regulating winding 34 as opposed to the separately excited field winding 36.

If an increase in the load is encountered, the voltage across conductors 14 and 16 tends to decrease, thereby effecting a reduction in the energization of the regulating winding 34 resulting in an unbalance between the ampere turns of the auxiliary winding 32, regulating winding 34 and the separately excited field winding 36. This unbalanced condition effects an increase in the resultant energization of the windings and an increase in the voltage output of the regulating generator 26, to say a point 62 above the point 58 of the curve of Fig. 2. The increase in the output of the generator 26 effects an increase in the energization of the separately excited field winding 20 to effectively increase the voltage output of the generator 10, thereby also effecting an increase in the energization of the regulating winding 34 until the balanced condition between the windings 32, 34 and 36 is again secured.

The effect of the auxiliary winding 32 in balancing the ampere turns of the windings 32, 34 and 36 and in giving a constant percent regulation in the change of the energization of the windings of generator 26 is readily apparent. Assuming that the auxiliary winding 32 is connected across the field 22 and resistor 24 to give a drooping characteristic, it will be differential with respect to the separately excited field winding 36, and will cooperate with the regulating winding 34 in opposing the energization of the separately excited field winding 36. Therefore, as the load is increased, the ampere turns of the auxiliary winding 32 is increased and since the effect of the auxiliary winding 32 is cumulative with respect to the regulating winding 34, less ampere turns in the regulating field 34 is required to balance the ampere turns of the separately excited field winding 36. The resultant drop in voltage will, therefore, be proportional to the increase in the load and this will be the same percentage for all voltages across the conductors 14 and 16, since the amount of the drop in the voltage depends on the ratio of the ampere turns of the auxiliary field winding 32 to the ampere turns of the separately excited field winding 36.

That a constant percent regulation is obtained is apparent when it is considered that the energization of the separately excited field winding 36 is maintained a constant, while the voltage control is obtained by adjusting the variable rheostat 48 in circuit with the regulating winding 34. The constant percentage regulation by this means, however, is limited to a minimum value of the voltage output of the generator 10 by the resistance of the regulating field winding 34 and where a lower voltage output is desired, it is necessary to adjust the variable rheostat 40 to insert additional sections of the rheostat in circuit with the separately excited field winding 36 to decrease the energization of the field winding 36.

In a particular system, by employing the arrangement of apparatus and circuits described hereinbefore, it has been found possible to obtain a constant percentage voltage regulation over the range of about 10 to 75 volts, while by adjusting the variable rheostat 40, it is possible to reduce the voltage below 10 volts and obtain a constant voltage droop in the regulation curve. This system is very sensitive, it being found that a constant percentage voltage regulation within plus or minus 1% can be obtained.

Where it is desired to provide constant percentage regulation down to zero voltage, the embodiment of this invention illustrated in Figs. 3 and 4 may be employed. In Fig. 3, there is illustrated the generator 10 and the regulating generator 64 driven through the shaft 12 from a constant power source such as a motor (not shown). As in the embodiment described hereinbefore the regulating generator 64 may be driven from a separate source of power than the motor which drives the generator 10, the primary requirement being that the regulating generator 64 is driven at a constant speed.

In this embodiment, the generator 10 comprises the armature winding 18, the commutating winding 22 and separately excited field windings 66 and 68 disposed to be connected in parallel circuit relation as will be explained more fully hereinafter. In this embodiment, a resistor 24 is also connected in series circuit relation with the commutating winding 22 and the conductor 14.

The regulating generator 64 is provided with the armature winding 28 and a plurality of field windings 70, 72, 32 and 34. In this embodiment, the field winding 34 is a regulating separately excited field winding connected across conductors 14 and 16, a balancing resistor 74 being connected in series circuit relation with the winding 34. The winding 32 is also a separately excited field winding functioning as an auxiliary winding and is disposed to be connected by the double throw switch 50 across the commutating winding 22 and the resistor 24 similarly to the embodiment described hereinbefore. In this particular embodiment, however, a variable rheostat 76 is connected in series circuit relation with the field winding 32, the purpose of which will be explained more fully hereinafter.

The field windings 70 and 72 of the generator 64 function as the self-energizing field winding 30 and the separately excited field winding 36 of the embodiment described herein. Referring to Fig. 4, the circuits of the field windings 70 and 72 with relation to the separately excited field windings 66 and 68 of generator 10 and the armature winding 28 of generator 64 is more clearly illustrated. As shown, the windings 70 and 72 of the regulating generator 64 are connected in parallel relation with each other and in series circuit relation with the armature winding 68 of the regulating generator 64. Each of the separately excited field windings 66 and 68 of the generator 10 is connected in series circuit relation with a field winding 70 and 72, respectively, of the regulating generator 64 in a balanced bridge circuit.

In this bridge circuit, the series connected windings 68 and 72 form one leg of the bridge and the windings 66 and 70 form another leg of the bridge. In order to provide a balanced bridge, a resistor 75 is connected in circuit in another leg of the bridge and a resistor 77 is connected in circuit as the fourth leg of the bridge. Thus, with the switch 42 in open circuit position and the resistor 75 and 77 adjusted to balance the windings 68 and 72 and 66 and 70, the balancing resistor 38 in series circuit relation with the armature winding 28 of the regulating generator 64 is so adjusted that the voltage output of the generator 64 caused by the current flowing in the windings 70 and 72 is just sufficient to equal the IR drop in the balanced loop. As illustrated, the bridge circuit is disposed to be connected to the constant power source, such as the battery 44 through a variable rheostat 78, this rheostat being employed for the purpose of obtaining voltage control.

With the switch 42 in open circuit position, the regulating generator 64 does not generate sufficient voltage to energize the separately excited field windings 66 and 68 of the generator 10, since the resistor 38 is adjusted at its critical resistance. When the switch 42 is operated to its circuit closing position, power is supplied to the bridge circuit from the battery 44 in an amount depending upon the adjustment of the variable rheostat 78. When power is supplied to the bridge circuit current flows through both the separately excited field windings 66 and 68 of the generator 10 and the series field windings 70 and 72 of the generator 64 to effectively energize the windings and thereby effect an increase in the voltage output of both the regulating generator 64 and the generator 10. The increase in the voltage output of the generator 10 effects an increase in the energization of the regulating field winding 34 which, as in the previous embodiment, is connected to be differential with respect to the series field windings 70 and 72 of regulator 64 until the ampere turns of the regulating winding 34 approximates the ampere turns of the windings 70 and 72.

As in the previous embodiment, the auxiliary winding 32 is employed for securing the desired percentage regulation. With the switch 50 actuated to connect the winding 32 across the commutating winding 22 and the resistor 24 to give a drooping characteristic, the ampere turns of the auxiliary winding 32 is differential with respect to the windings 70 and 72 and cumulative with respect to the regulating winding 34.

If the variable rheostat 76 were not in circuit with the winding 32, a constant voltage correction would be obtained since for a constant load on the generator a constant ampere turn correction would be secured. However, in this particular system, with the variable rheostat 76 in circuit with the field winding 32 a constant percentage regulation is obtained by so adjusting the variable rheostat 76 in synchronism with the variable rheostat 78 that when the rheostat 78 is adjusted to give a low voltage, the variable rheostat 76 is also adjusted to give a low energization of the field winding 32. In practice, it is desired to have these two variable rheostats operated simultaneously and preferably from one operating means.

With the generator 10 supplying power to a constant load, if the load should be increased, the voltage across conductors 14 and 16 is decreased effecting a decrease in the energization of the regulating winding 34, whereby the resultant energization of the plurality of field windings of the generator 64 is increased to effect an increase in the voltage output of the regulating generator 64. The increase in the voltage of the generator 64 effects an increase in the energization of the separately excited field winding 66 and 68 of the generator 10 to increase the voltage output of the generator 10 and consequently the energization of the regulating winding 34. This voltage output of the generator 10 is increased until a balanced condition between the field windings of the regulating generator 64 is again obtained. As is apparent, by adjusting the variable rheostat 78 to remove more of its sections from the circuit more current flows in the bridge circuit giving an increase in the ampere turns on the series field windings 70 and 72 of the regulating generator 64 whereby the energization of the regulating winding 34 must be further increased to effect a balance between the ampere turns of the field windings of the generator 64 thereby providing for obtaining a higher voltage output of the generator 64 and consequently the generator 10.

With the embodiment illustrated in Figs. 3 and 4, it is possible to obtain a constant percentage voltage regulation of the same magnitude as is obtained for the embodiment illustrated in Fig. 1, the range, however, being extended in the embodiment of Fig. 3 from zero voltage up to the desired maximum voltage.

Although this invention has been described with reference to particular embodiments thereof, it is, of course, not to be limited thereto except insofar as is necessitated by the prior art and the scope of the appended claims.

I claim as my invention:

1. In a regulating system, in combination, a generator having a plurality of separately excited field windings connected in parallel with each other, a regulating generator disposed to excite the generator separately excited field windings, a constant source of power, a plurality of field windings for the regulating generator each of which is connected in series circuit relation with the regulating generator armature winding and a generator separately excited field winding and in parallel circuit relation with each other and disposed to respond to a function of the regulating generator voltage and the constant source of power, a regulating field winding for the regulating generator connected to respond to the generator voltage, and an auxiliary field winding for the regulating generator disposed to respond to a function of the generator current.

2. In a regulating system, in combination, a generator having a plurality of separately excited field windings connected in parallel with each other, a regulating generator disposed to excite the generator separately excited field windings, a constant source of power, a plurality of field windings for the regulating generator each of which is connected in series circuit relation with the regulating generator armature winding and a generator separately excited field winding and in parallel circuit relation with each other and disposed to respond to a function of the regulating generator voltage and the constant source of power, a regulating field winding for the regulating generator connected to respond to the generator voltage, an auxiliary field winding for the regulating generator disposed to respond to a function of the generator, and means for so connecting the auxiliary field winding to the generator as to impart a drooping or raising characteristic to the generator voltage.

EARL C. WATSON.